US012574269B2

(12) United States Patent
Arslan et al.

(10) Patent No.: US 12,574,269 B2
(45) Date of Patent: Mar. 10, 2026

(54) PUNCTURING A CORRELATION SEQUENCE USED IN HIGH ACCURACY DISTANCE MEASUREMENTS

(71) Applicant: Silicon Laboratories Inc., Austin, TX (US)

(72) Inventors: Guner Arslan, Austin, TX (US); Yi Shen Yeh, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 18/796,477

(22) Filed: Aug. 7, 2024

(65) Prior Publication Data

US 2026/0046177 A1 Feb. 12, 2026

(51) Int. Cl.
H04L 25/03 (2006.01)
H04L 1/00 (2006.01)

(52) U.S. Cl.
CPC ...... H04L 25/03178 (2013.01); H04L 1/0013 (2013.01)

(58) Field of Classification Search
CPC ..................... H04L 25/03178; H04L 1/0013
USPC .................................. 375/262, 316
See application file for complete search history.

(56) References Cited

U.S. PATENT DOCUMENTS

| | | | | |
|---|---|---|---|---|
| 7,610,397 B2 * | 10/2009 | Gedik | ..................... | H04L 49/90 709/234 |
| 9,495,390 B2 * | 11/2016 | Charikar | ................. | G06F 16/51 |
| 11,146,360 B2 * | 10/2021 | Hassan | ................. | H04L 1/0069 |
| 2002/0186778 A1 * | 12/2002 | Agami | ................ | H04L 27/3461 375/261 |
| 2006/0085592 A1 * | 4/2006 | Ganguly | ............. | G06F 16/2456 711/114 |
| 2016/0072599 A1 * | 3/2016 | Kariyappa | ....... | G11B 20/10527 700/94 |
| 2017/0142451 A1 * | 5/2017 | Xu | ..................... | H04N 21/8455 |
| 2021/0021373 A1 * | 1/2021 | Hassan | ............... | H04J 13/0029 |
| 2022/0311650 A1 * | 9/2022 | Oehler | ............... | H04L 27/2278 |
| 2025/0105935 A1 * | 3/2025 | Chandak | .............. | H04B 17/346 |

OTHER PUBLICATIONS

Bluetooth Sig Proprietary; "Channel Sounding," Core Specification Working Group, Jun. 22, 2023, pp. 1-284.
Hillyard et al; Bluetooth Blog, Bluetooth Channel Sounding—A Step Towards 10-cm Ranging Accuracy for Secure Access, Digital Key, and Proximity Services, Nov. 30, 2023, pp. 1-8.
Silicon Labs; "Channel Sounding", Wireless //Bluetooth //Channel Sounding, 2024, pp. 1-7.

(Continued)

*Primary Examiner* — Emmanuel Bayard
(74) *Attorney, Agent, or Firm* — Trop, Pruner & Hu, P.C.

(57) ABSTRACT

In one embodiment, a method includes: generating, in a baseband processor of a receiver, a random correlation sequence; determining a first number of a first type of a predetermined tuple pattern present in the random correlation sequence, and determining a second number of a second type of the predetermined tuple pattern present in the random correlation sequence; and based at least in part on the first and second numbers, puncturing a bit of the random correlation sequence.

20 Claims, 8 Drawing Sheets

(56)           References Cited

OTHER PUBLICATIONS

The Mathworks, Inc., "Unwrap—Shift phase angles", downloaded from https://www.mathworks.com/help/matlab/ref/unwrap.html#f98-998446_vh, published at least as early as Jan. 1, 2024, pp. 1-8.
U.S. Appl. No. 18/659,261, filed May 9, 2024, entitled Channel Recovery Using Group Delay Information, by Markku Majaniemi, pp. 1-32.

* cited by examiner

600

Correlation Sequence [0.1]
Corr_seq

605

610   i < len ?   No

Yes

620   Corr_seq[i:i+2] is type 1 ?   No   625   Corr_seq[i:i+2] is type 2 ?   No

Yes   630   N1 ++ store index

Yes   635   N2 ++ store index

660   N1>N2 ?   No   670   N1<N2 ?   No

Yes   665   Puncture left -most type1

Yes   675   Puncture right -most type2

680   No puncturing required

655

PUNCTURING A CORRELATION SEQUENCE USED IN HIGH ACCURACY DISTANCE MEASUREMENTS

BACKGROUND

Wireless devices are ubiquitous, and are used in a wide variety of situations. Some use cases involve two devices in close proximity to each other, where it is desired to accurately determine a distance between the devices. One solution for distance estimation in Bluetooth implementations is a High Accuracy Distance Measurement (HADM) that leverages a channel sounding process.

In general, channel sounding uses Phase-Based Ranging (PBR), Round TripTime (RTT), or both to accurately measure the distance between two wireless devices. In this channel sounding process, signals are sent between initiator and reflector, and the received signals are then sampled. Distance estimation is then based on these samples. However, the sampling is typically performed at a limited oversampling rate (OSR). With the limit of oversampling rate, the resolution of HADM is limited to a certain amount, leading to potential inaccuracies in distance estimation.

SUMMARY OF THE INVENTION

In one aspect, a method includes: generating, in a baseband processor of a receiver, a random correlation sequence; determining a first number of a first type of a predetermined tuple pattern present in the random correlation sequence, and determining a second number of a second type of the predetermined tuple pattern present in the random correlation sequence; and based at least in part on the first number and the second number, puncturing a bit of the random correlation sequence.

In one implementation, the method further comprises puncturing the bit of a selected instance of the first type of the predetermined tuple pattern when the first number exceeds the second number. Puncturing the bit of the selected instance of the first type of the predetermined tuple pattern may involve puncturing a left most bit of a first instance of the first type of the predetermined tuple pattern within the random correlation sequence.

In one implementation, the method further comprises correlating the punctured random correlation sequence with an incoming frequency signal to obtain a correlation result, the incoming frequency signal received from a transmitter in communication with the receiver. The method may also include determining, based at least in part on the correlation result, a distance between the transmitter and the receiver. Determining the distance may include: calculating a time estimate based at least in part on the correlation result; and determining the distance using the time estimate. The method may also include in response to determining that the receiver is within a threshold distance of the transmitter, performing a security operation for at least one of the transmitter and the receiver.

In one implementation, the method further comprises not puncturing the bit of the random correlation sequence when the first number equals the second number. The method also may include, based at least in part on the first number and the second number, puncturing a plurality of bits of the random correlation sequence.

In another aspect, an apparatus includes a radio frequency (RF) transceiver to transmit and receive RF signals and a baseband processor coupled to the RF transceiver. The baseband processor may include: a puncturer to receive a random bit sequence and, based at least in part on a first count of a first predetermined tuple pattern present in the random bit sequence and a second count of a second predetermined tuple pattern present in the random bit sequence, puncture a bit of the random bit sequence; a correlator coupled to the puncturer, the correlator to correlate a received sequence with the punctured random bit sequence to obtain a correlation result; and a circuit coupled to the correlator to determine a distance between the apparatus and a second device based at least in part on the correlation result.

In an implementation, the puncturer is to analyze the random bit sequence to determine the first count of the first predetermined tuple pattern and the second count of the second predetermined tuple pattern. The circuit may include a calculator to calculate a time estimate based at least in part on the correlation result. The puncturer is to puncture a bit of a selected instance of the first predetermined tuple pattern when the first count exceeds the second count. The puncturer is to puncture the bit of the selected instance of the first predetermined tuple pattern comprising a left most bit of a first instance of the first predetermined tuple pattern within the random bit sequence.

In an implementation, when the second count exceeds the first count, the puncturer is to puncture a bit of a selected instance of the second predetermined tuple pattern comprising a right most bit of a last instance of the second predetermined tuple pattern within the random bit sequence.

In one implementation, the apparatus may be a vehicle computing system of a vehicle, and in response to a determination that the second device comprising a key fob is within a threshold distance of the vehicle computing system, is to cause the vehicle to be unlocked.

In yet another aspect, a method includes: generating a random correlation sequence; determining a count of one or more predetermined tuple patterns present in the random correlation sequence; and based at least in part on the count of the one or more predetermined tuple patterns, puncturing at least a portion of an instance of at least one of the one or more predetermined tuple patterns present in the random correlation sequence.

In an implementation, determining the count of the one or more predetermined tuple patterns comprises: determining a first number of a first type of a first predetermined tuple pattern present in the random correlation sequence; and determining a second number of a second type of the first predetermined tuple pattern present in the random correlation sequence. The method may also include: puncturing a bit of a selected instance of the first type of predetermined tuple pattern when the first number exceeds the second number; and puncturing a bit of a selected instance of the second type of predetermined tuple pattern when the second number exceeds the first number.

In an implementation, the method further comprises: correlating the punctured random correlation sequence with an incoming frequency signal to obtain a correlation result, the incoming frequency signal received from a transmitter in communication with the receiver; calculating a time estimate based at least in part on the correlation result; and determining the distance using the time estimate.

DETAILED DESCRIPTION

In various embodiments, a wireless device is configured to initiate a channel sounding procedure to obtain sample information of multiple channels of a wireless link that couples two wireless devices. During this channel sounding procedure, a receiver generates sample information in the form of a random correlation sequence that is to be used to perform a correlation with incoming sample information (received from a transmitter). With embodiments, this generated correlation sequence can be analyzed to determine whether it is appropriate to puncture a portion of it, to avoid bias effects that would otherwise exist.

The channel sounding process uses communications between the devices over one or more antenna paths, where multiple antennas can be leveraged to minimize multipath effects and enhance accuracy. In channel sounding, a first device is designated as an initiator and a second device is designated as a reflector. These devices exchange information across a subset of the wireless physical channels of their wireless link, with the initiator transmitting first, followed by the reflector's response. For RTT-based channel sounding, a Time of Flight (ToF) for a packet to be exchanged between the initiator and the reflector is measured, and from this, the distance can be estimated. To achieve this, both devices record the Time of Arrival (ToA) and the Time of Departure (ToD). The differences between ToA and ToD for both the initiator and the reflector provide the data necessary for a reliable distance calculation.

As described above in the Background, with a limited OSR, HADM resolution is limited. A curve fitting technique can be used to determine a more fine fractional timing, as described further below. Embodiments further improve on fine fractional timing by making smart decisions on which symbols of a correlation sequence to discard (puncture) in order to rebalance the curve fitting formula, removing an inherent bias and improving precision in distance measurements. In this way, embodiments may increase accuracy of distance measurements without any increase in OSR and/or increase in power consumption and area.

Figure 1:
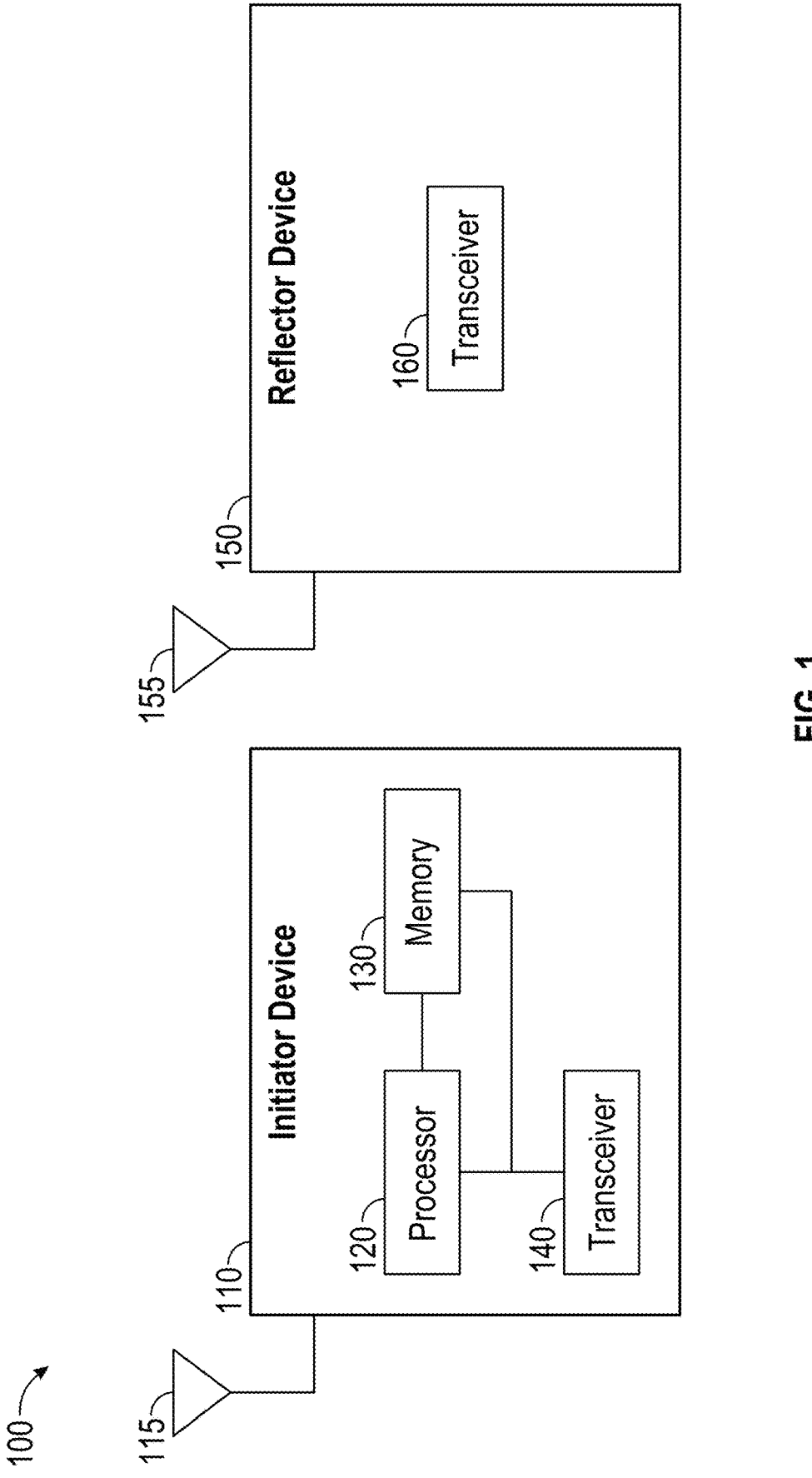
FIG. 1 is a block diagram of a wireless environment in accordance with an embodiment.

Referring now to FIG. 1, shown is a block diagram of an environment in accordance with an embodiment. More specifically as shown in FIG. 1, an environment 100 is a short-range wireless network that includes devices in communication with each other according to a given short-range wireless protocol. While embodiments described herein are in connection with a Bluetooth protocol, understand that the techniques described herein may be used in connection with other protocols.

In the high level shown in FIG. 1, a first wireless device is implemented as an initiator device 110 that is in wireless communication with a second wireless device, implemented as a reflector device 150. One or both devices may be Internet of Things (IOT) devices, in some use cases. Although embodiments are not limited in this regard, for purposes of illustration, assume that initiator device 110 is a vehicle system, such as a vehicle computing system, while reflector device 150 is a key fob for the vehicle. With embodiments herein, a channel sounding process may be performed between these devices to enable efficient, low power distance estimation. With this accurate distance estimation, a given operation such as a security operation may be performed. For example, the vehicle computing system may cause the vehicle and/or its doors to be unlocked based at least in part on the distance estimation. With embodiments herein, this distance estimation may be performed according to a channel sounding process in which sample information in the form of a correlation sequence can be punctured if needed to remove or reduce bias in fine fractional timing.

In the high level view shown in FIG. 1, initiator device 110 includes at least one antenna 115. In addition, initiator device 110 includes a processor 120, which may be implemented as a system on chip (SoC) or other host processor of the vehicle computing system. As seen, processor 110 couples to a memory 130 and also to a transceiver 140. In embodiments, transceiver 140 may be implemented as a multi-protocol transceiver that also can be part of a SoC, e.g., including one or more cores (such as a microcontroller unit (MCU) or other core), that performs wireless communication according to multiple wireless protocols, including, e.g., Bluetooth (and Bluetooth Low Energy (BLE)) and Wi-Fi protocols. As such, transceiver 140 may perform a channel sounding process in accordance with an embodiment to enable accurate and efficient distance estimation between initiator device 110 and reflector device 150. Although shown with these limited components in the embodiment of FIG. 1, understand that a vehicle computing system may include many more components, including sensors, storage, additional processing resources and so forth.

Still with reference to FIG. 1, reflector device 150 also includes at least one antenna 155. As shown, reflector device 150 also includes a transceiver 160, which also may be a multi-protocol wireless transceiver. Of course in other implementations, transceiver 160 may be implemented as a single protocol transceiver, e.g., a Bluetooth transceiver. In any event, transceiver 160 is configured to perform a channel sounding process in response to a request for the channel sounding process received from initiator device 110.

Understand that in the high level view illustrated in FIG. 1, reflector device 150 is shown with only antenna 155 and transceiver 160; of course, additional components may be present, such as a non-volatile storage to store a tag or other key for use in authentication. In other cases, transceiver 160 may include non-volatile storage to store such key. Similarly, transceiver 160 may be implemented as a SoC that includes some type of processing resource, such as a microcontroller, processing core or so forth, to control wireless communications as well as to perform a channel sounding process as described herein.

Figure 2:
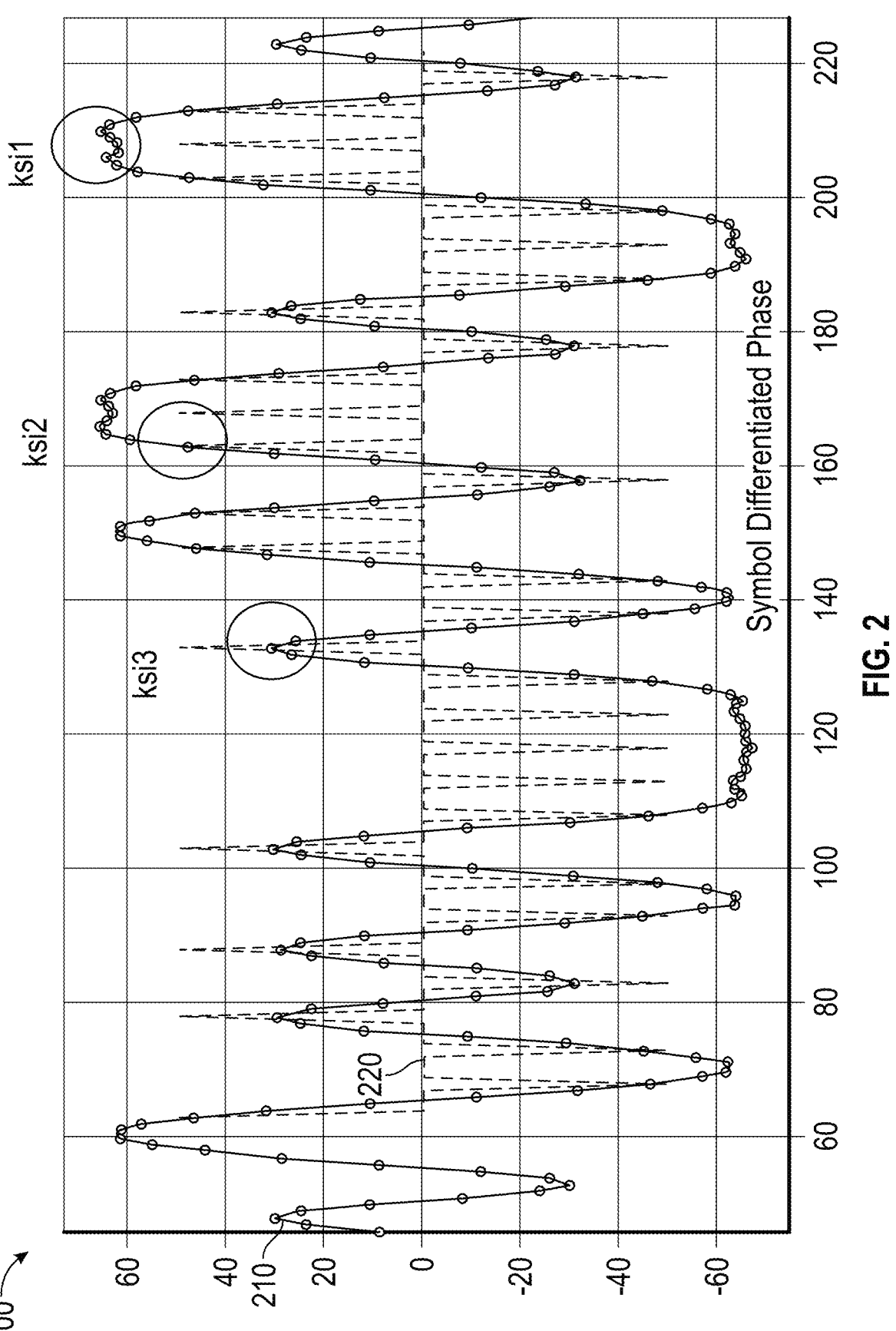
FIG. 2 is a graphical illustration of an incoming received signal and a correlation sequence with which the received signal is to be correlated.

Referring now to FIG. 2, shown is a graphical illustration of an incoming received signal and a correlation sequence with which the received signal is to be correlated. More specifically, in graphical illustration 200, an incoming received signal 210 is shown. In an embodiment, this received signal may be in the form of a symbol differentiated phase resulting from communication of a sequence by a transmitter with which a receiver is in communication.

This received signal may be part of a channel sounding communication sent from the transmitter in the process of determining a distance estimation. Superimposed on signal 210 is a correlation sequence 220, which is a randomly generated bit sequence (e.g., a 96 bit random bit sequence (RBS)). As shown, correlation sequence 220 includes a plurality of values that have a value of plus or minus one.

As a result of the pattern of values that form sequence 220, an inherent bias may exist when performing correlations using this correlation sequence. For example, shown in inset in FIG. 2 are three different values representing a plus one value of the incoming received signal 210. These different values, referred to herein as ksi values, namely ksi1, ksi2, ksi3, result from different binary sequences, namely binary 3-tuples of the correlation sequence.

In embodiments, during HADM processing a receiver seeks to detect an incoming packet by searching for a pattern such as a sync sequence. This search may be performed via a correlation with a desired sequence (e.g., a random but known correlation sequence). The peak of the correlation above a predetermined threshold indicates detection of the packet. Since detection is done with digitized samples, resolution of RTT is limited by the sampling period. For example, a demodulator that operates at a 5 MHz sampling rate provides a resolution of 200 nanoseconds (ns) or 60 meters (m). Thus fine tuning is performed to increase the resolution in the estimate, e.g., to approximately 1 m RMS error. One way of accomplishing fine fractional timing is to fit a parabola to the correlation peak.

Figure 3:
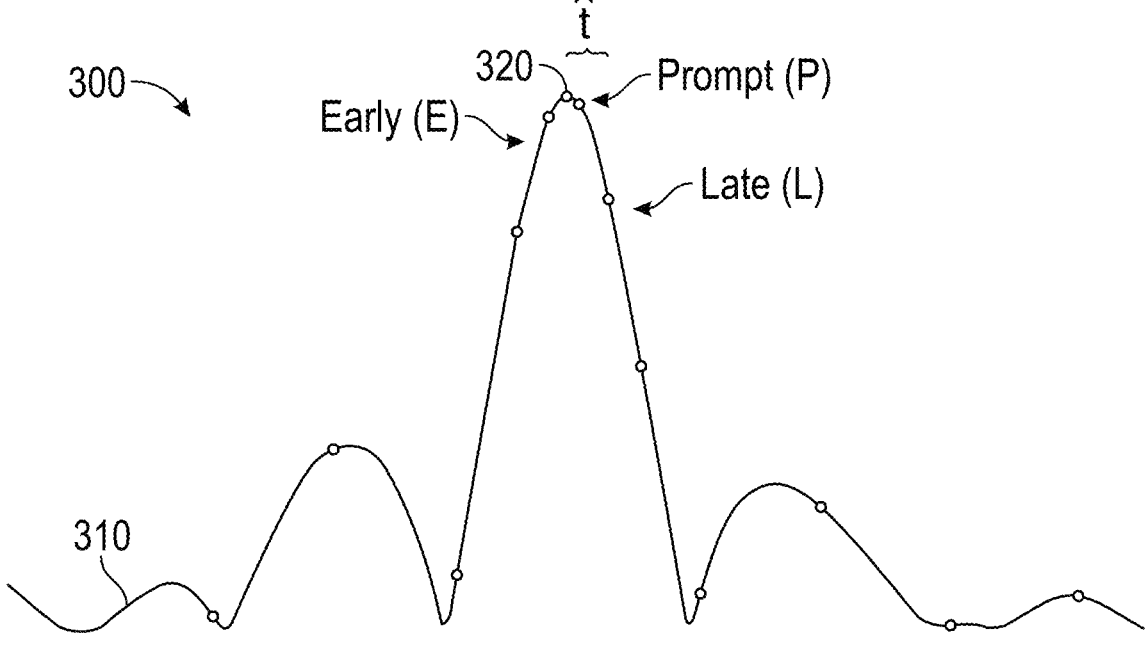
FIG. 3 is a graphical illustration of a fine timing estimation in accordance with an embodiment.

Referring now to FIG. 3, shown is a graphical illustration of a fine timing estimation that is done using a correlation result between a received signal and a correlation sequence. More specifically, graphical illustration 300 shows a correlation result 310, which is an amplitude of the correlation performed between a received signal and a correlation sequence. As shown, at a peak 320 of correlation result 310, there are multiple samples identified, namely an early (E) sample, a prompt (P) sample, and a late (L) sample. This peak can be estimated by using the correlation value of the E, P, and L samples. With this information, a time estimate ($\hat{t}$) (reflecting the difference between the P sample and the peak) may be determined by fitting a parabola to the correlation peak as follows:

$$\hat{t} = \frac{E - L}{2L + 2E - 4P} \qquad \text{(Eq. 1)}$$

Figure 4:
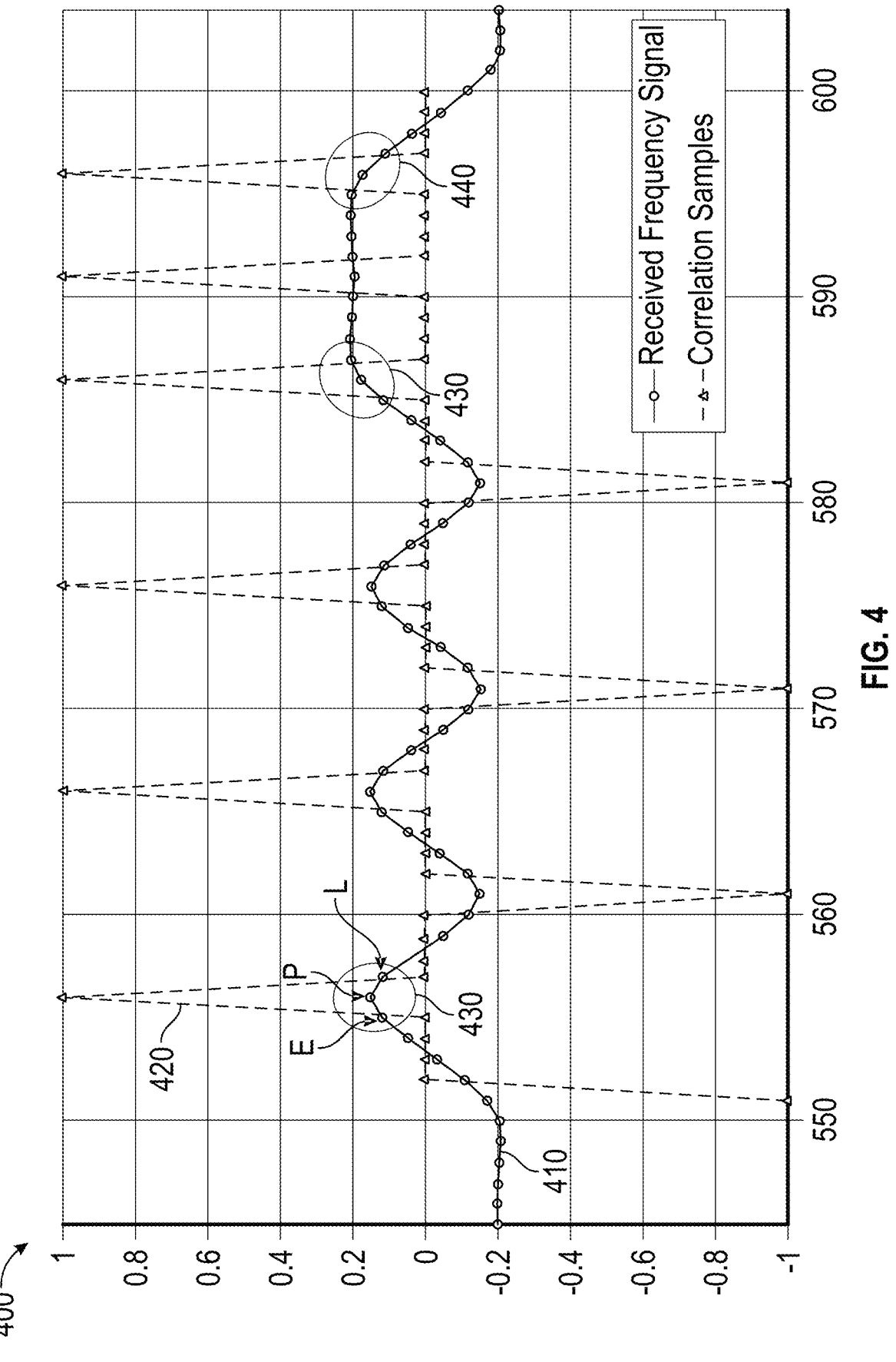
FIG. 4 is another graphical illustration describing a bias effect in ksi values resulting from a binary sequence.

Referring now to FIG. 4, shown is another graphical illustration describing the bias effect in ksi values resulting from a binary sequence. As shown in illustration 400, a received signal 410 is superimposed on a correlation sequence 420. Note that for ksi values of ksi1 and ksi3, there are substantially equal E and L values, as shown at inset 430. However, for a ksi2 value, the E and L values can differ substantially, as shown at insets 430 and 440.

While these specific instances are illustrated in FIG. 4, understand that a binary sequence, e.g., a given random correlation sequence, can be segmented into a plurality of 3-tuples. More specifically, a random sequence formed of one and zero bit values can have the following four tuple types shown in Table 1 below.

TABLE 1

| Type 1 $\lvert E \rvert > \lvert L \rvert$ | Type 2 $\lvert E \rvert < \lvert L \rvert$ | | $\lvert E \rvert = \lvert L \rvert$ |
|---|---|---|---|
| 110 | 011 | 111 | 101 |
| 001 | 100 | 000 | 010 |

As shown in Table 1, there are two types of ksi2 patterns: (1) where the absolute value of the early sample is greater than the absolute value of the late sample (a Type 1 ksi2 pattern); and (2) where the absolute value of the early sample is less than the absolute value of the late sample (a Type 2 ksi2 pattern).

The bias effects introduced by these various sequences, namely, the Type 1 and Type 2 ksi2 values, can be removed or reduced by puncturing the correlation sequence to remove at least a portion of at least one of these ksi2 patterns. More specifically, in one implementation a single bit may be punctured (i.e., removed) from a correlation sequence.

As will be described further herein, this punctured bit can be removed from a selected ksi2 pattern within the correlation sequence. While the implementations herein select a particular bit position, namely, a left or right-most bit from a left or right-most ksi2 pattern, understand that in other implementations a different one or more bits can be punctured.

Figure 5:
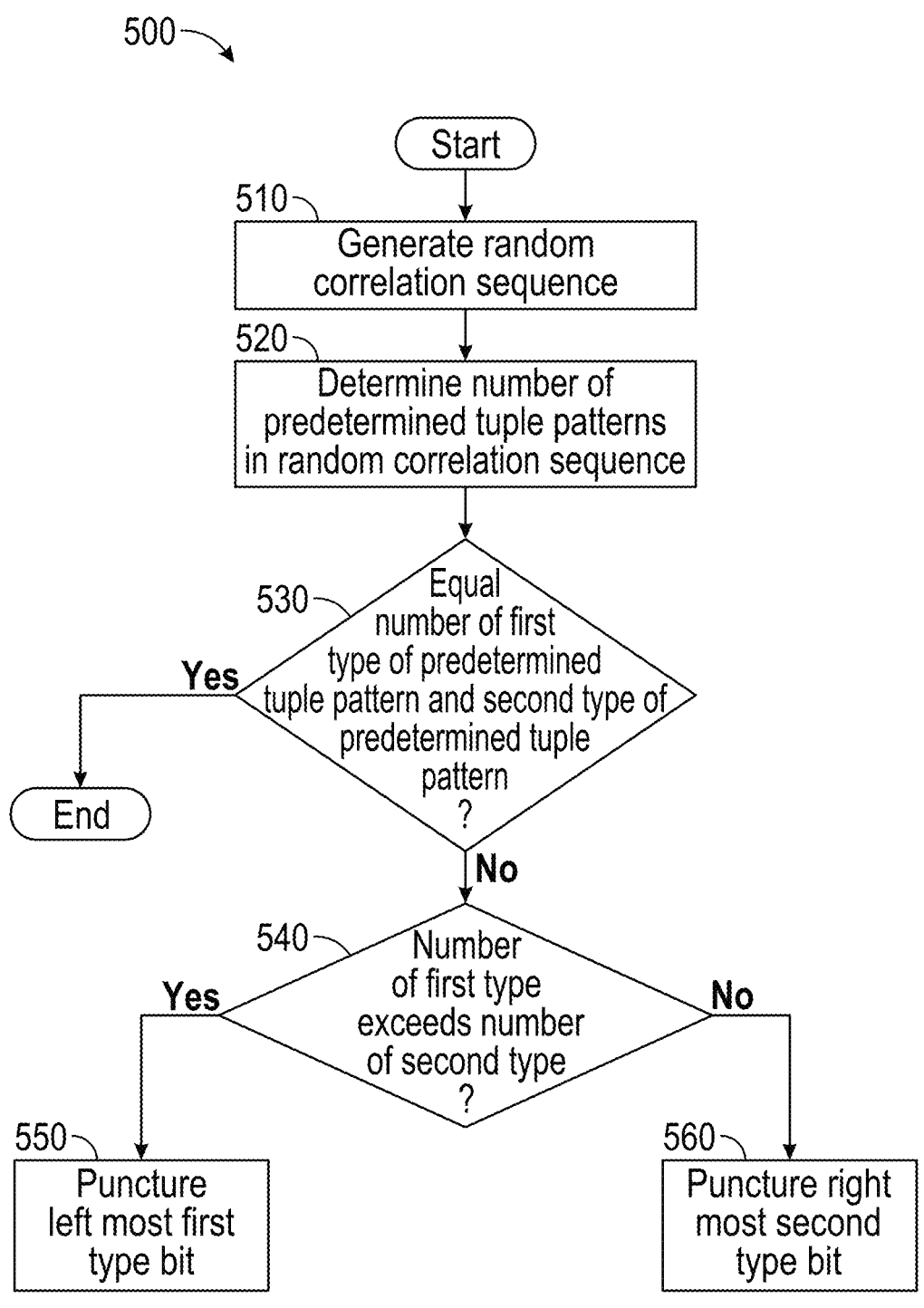
FIG. 5 is a flow diagram of a method in accordance with an embodiment.

Referring now to FIG. 5, shown is a flow diagram of a method in accordance with an embodiment. More specifically, method 500 is a method for determining whether to puncture part of a correlation sequence. In embodiments, method 500 may be performed by hardware circuitry of a receiver, such as a puncturer, which may be part of a baseband processor of the receiver. As such, method 500 may be performed by hardware circuitry alone, and/or in combination with firmware and/or software such as may be stored in a non-transitory storage medium.

As illustrated, method 500 begins by generating a random correlation sequence (block 510). In different implementations, this random but known correlation sequence may be of a given bit length, e.g., 32 or 96 bits. In an embodiment, a deterministic random number generator of the baseband processor may generate this correlation sequence. In embodiments, the correlation sequence may be generated based on a mutually agreed seed, which can be determined during a secure negotiation between the devices prior to the channel sounding process. Next it is determined the number of tuple patterns in the random correlation sequence that are of a predetermined pattern. More specifically, as described above, 3-tuples of the random correlation sequence can be analyzed to identify the number of Type 1 and Type 2 ksi2 patterns. Next, it is determined at diamond 530 whether there are equal numbers of these first and second types of the predetermined tuple patterns. If so, no puncturing is needed and method 500 concludes.

Otherwise, if there are not equal numbers, control passes from diamond 530 to diamond 540 to determine whether the number of the first type exceeds the number of the second type. If so, control passes to block 550, where the left most bit of the first type of predetermined tuple pattern is punctured. In an implementation, this bit may be punctured from the first Type 1 ksi2 pattern present in the sequence. Otherwise, if the number of the second type exceeds the number of the first type, control passes to block 560, where the right most bit of the second type of predetermined tuple pattern is punctured. In an implementation, this bit may be punctured from the last Type 2 ksi2 pattern present in the sequence. Although shown at this high level in the embodiment of FIG. 5, understand that many variations and alternatives are possible.

Figure 6:
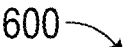
FIG. 6 is a flow diagram of a method in accordance with another embodiment.

Referring now to FIG. 6, shown is a method in accordance with another embodiment. More specifically, method 600 is a more detailed method for determining whether to puncture a correlation sequence as described herein. As such, method 600 may be performed by a puncturer or other baseband processing circuitry alone, and/or in combination with firmware and/or software.

As shown, method 600 begins by executing a For loop 605, which is performed for analysis of all of the bits of a correlation sequence. As shown, For loop 605 begins by determining whether an index i, which is initialized to a value of zero, is less than a length of the correlation sequence (diamond 610). If so, control passes to diamond 620 to determine whether a given 3-tuple of the correlation sequence is a Type 1 ksi2 value. If so, a count (N1) of such Type 1 values is incremented, and an index for this Type 1 pattern is stored (block 630). Control then passes back to diamond 610.

Otherwise, if it is determined that the 3-tuple is not a Type 1 pattern, control passes to diamond 625, where it is determined whether this 3-tuple is a Type 2 sequence. If so, at block 635, a count (N2) of such Type 2 values is incremented, and an index for this Type 2 pattern is stored. Control then passes back to diamond 610.

When the full length of the correlation sequence has been analyzed, control then passes to an If-Else loop 655. As shown here, it is determined at diamond 660 whether the number of Type 1 3-tuples exceeds the number of Type 2 3-tuples. If so, control passes to block 665, where a left most Type 1 pattern can be punctured. In a particular implementation, the left most bit of this left most Type 1 pattern is punctured. Otherwise, if the number of Type 1 patterns does not exceed the number of Type 2 patterns, control passes to diamond 670, where it is determined whether the number of Type 2 patterns exceeds the number of Type 1 patterns. If so, control passes to block 675, where a right most Type 2 pattern can be punctured. In a particular implementation, the right most bit of this right most Type 2 pattern is punctured. Otherwise, if the numbers of Type 1 and Type 2 patterns are equal, control passes to block 680, where no puncturing is performed. Although shown at this high level in the embodiment of FIG. 6, many variations and alternatives for puncturing a correlation sequence are possible.

For example, in other implementations, puncturing may be performed based on other conditions within a generated correlation sequence. In one implementation, the number of ksi1 symbols can be monitored. As discussed above, ksi1 levels are reached when tuples are 111 or 000, so there is no bit transition. In this case, nominally E=P=L, which does not actually fit the parabolic model (as shown in FIG. 3). As the number of ksi1 symbols increases in a sequence, E and L get closer and closer to P by a value of d. For the same timing offset, different results from Eq. 1 may occur based on how many ksi1 symbols are in the bit sequence.

In an implementation that considers the number of ksi1 values, at least one ksi1 symbol can be punctured when the number exceeds a given threshold. With an example of a 32-bit RBS, the threshold can be set at 10 ksi1 symbols. If more than this number of ksi1 symbols are present, at least one ksi1 symbol can be punctured. Note that by dropping a ksi1 symbol, there are fewer numbers of symbols in the correlation, which may lose signal-to-noise ratio (SNR) but may achieve gain by avoiding the bias.

To formulate this issue, assume that the number of ksi1 symbols in the bit sequence cause an equal increase in the E and P values with respect to the P value. Thus Equation 1 can be transformed into Equation 2:

$$(\hat{t})=(E+d-(L+d))/(2*(E+d)+2*(L+d)-4*P)=E-L/(2*L+2*E-4*P+4d) \qquad \text{[Eq. 2]}$$

In EQ. 2, the d term as defined above is added to the denominator and as d increases (which it will as the number of ksi's increases), the estimate $\hat{t}$ would inadvertently change, which can be avoided by puncturing ksi1 values. In another implementation, instead of puncturing the ksi1 values, a new random bit sequence can be forced by not responding to a current packet. In yet another implementation, the bias due to d can be estimated by the number of ksi1 values in the random bit sequence, and the final value t can be corrected with this pre-determined correction term. Since no puncturing is done, this would not cause a loss in SNR, and therefore may perform better than the other implementations.

Figure 7:
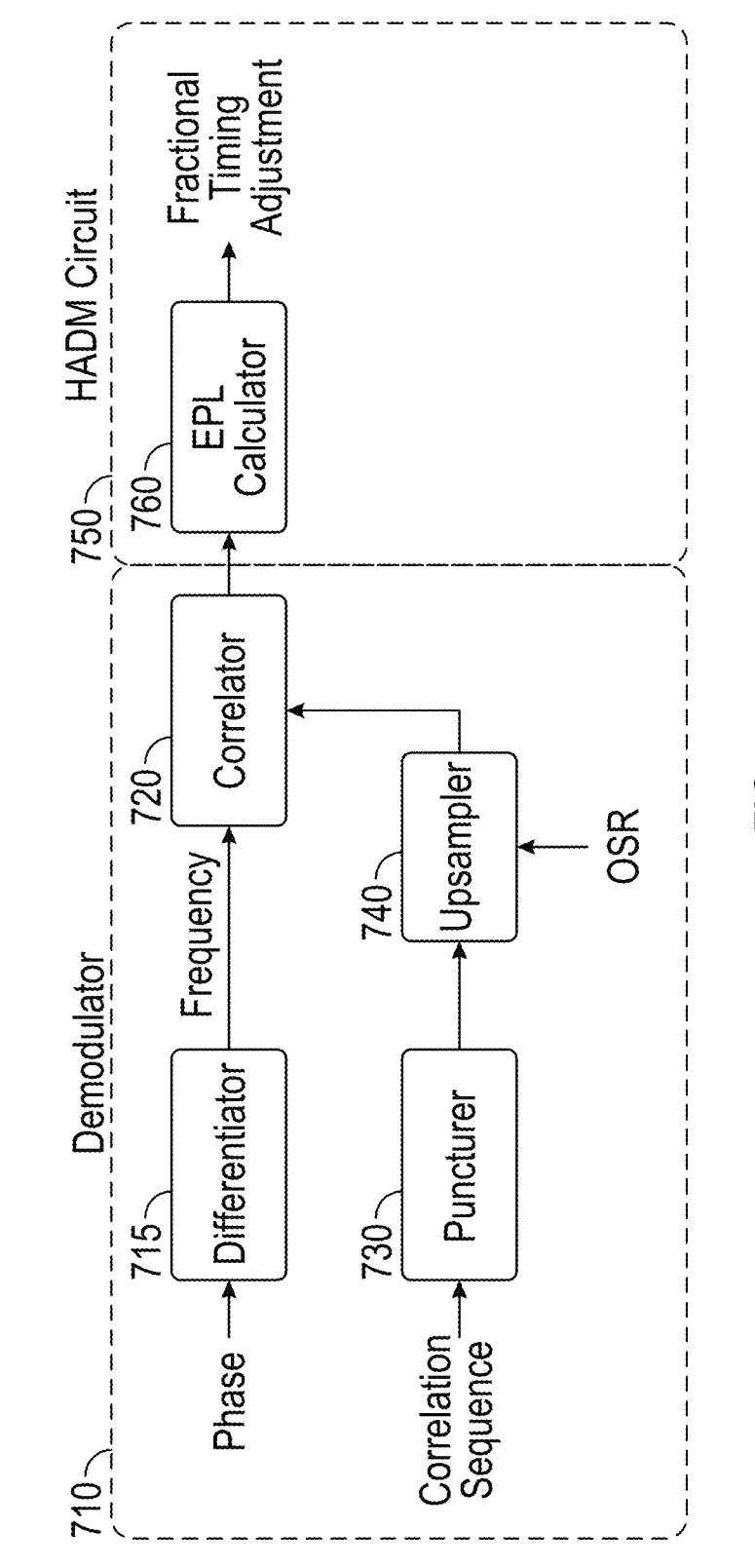
FIG. 7 is a block diagram of baseband processing circuitry in accordance with an embodiment.

Referring now to FIG. 7, shown is a block diagram of baseband processing circuitry in accordance with an embodiment. More specifically, as shown in FIG. 7, demodulator circuitry and HADM circuitry is illustrated. As shown, demodulator 710 receives incoming phase signals, which in this instance may correspond to a received transmission sent by a transmitter. These phase signals are differentiated in a differentiator 715 to obtain frequency signals that are provided to a correlator 720. Correlator 720 may perform a correlation and/or convolution with a generated correlation sequence.

To avoid the bias situation described above, as further shown in FIG. 7, a generated random bit sequence that is to be used as the correlation sequence is first provided to a puncturer 730. In embodiments, puncturer 730 may perform the determinations and puncturing described above in at least one of FIGS. 5 and 6. Next, the potentially punctured correlation sequence is provided to an upsampler 740, which upsamples the correlation sequence according to an oversampling rate (OSR). In an embodiment, the OSR may be 4 or 5, but other values are possible. With an OSR implementation, a received sequence has OSR samples for each symbol. The receiver splits the received sequence into OSR sequences and correlates each separately. Note that other implementations may not perform upsampling.

The upsampled potentially punctured correlation sequence is then provided to correlator 720 for performing the correlation with the received signal. The resulting correlation values are provided to an EPL calculator 760, which is part of HADM circuit 750. EPL calculator 760 determines a fractional timing adjustment to determine actual timing of the peak of a parabola, based on a given number of samples (e.g., 3, with reference back to EQ. 1) around the peak. Stated another way, these samples are used to estimate a time delay and location of the peak (as a coarse estimate). Then a time estimate (t̂) is determined (e.g., using EQ. 1 above), and is added to the coarse estimate to find the real timing. This fractional timing adjustment is used, in turn, to determine distance between the devices. Although shown at this high level in the embodiment of FIG. 7, many variations and alternatives are possible. For example, in certain implementations an upsampler may not be present, and there may be OSR copies of the correlator, each working on a different phase.

In other implementations, EPL calculator 760 can determine a fractional adjustment using more than 3 samples around a peak. For example, 5 or 7 samples can be used in determining a fractional adjustment. For a 5 sample example, EQ. 1 can be modified as follows:

$$t5=10(L1-E+L2-E2)/(12(E1+E2+L1+L2-4P)) \quad \text{[EQ. 3]}$$

For a 7 sample example, EQ. 1 can be modified to:

$$t7=24(L1-E+L2-E2+L3-E3)/(28(E1+E2+E3+L1+L2+L3-6P)) \quad \text{[EQ. 4]}$$

In the above Equations, E1 is the original E early sample (the sample before P) and E2 is the sample before E1, and E3 is the sample before E2. Similarly the L samples are in order L1, L2, L3, the samples after P.

Figure 8:
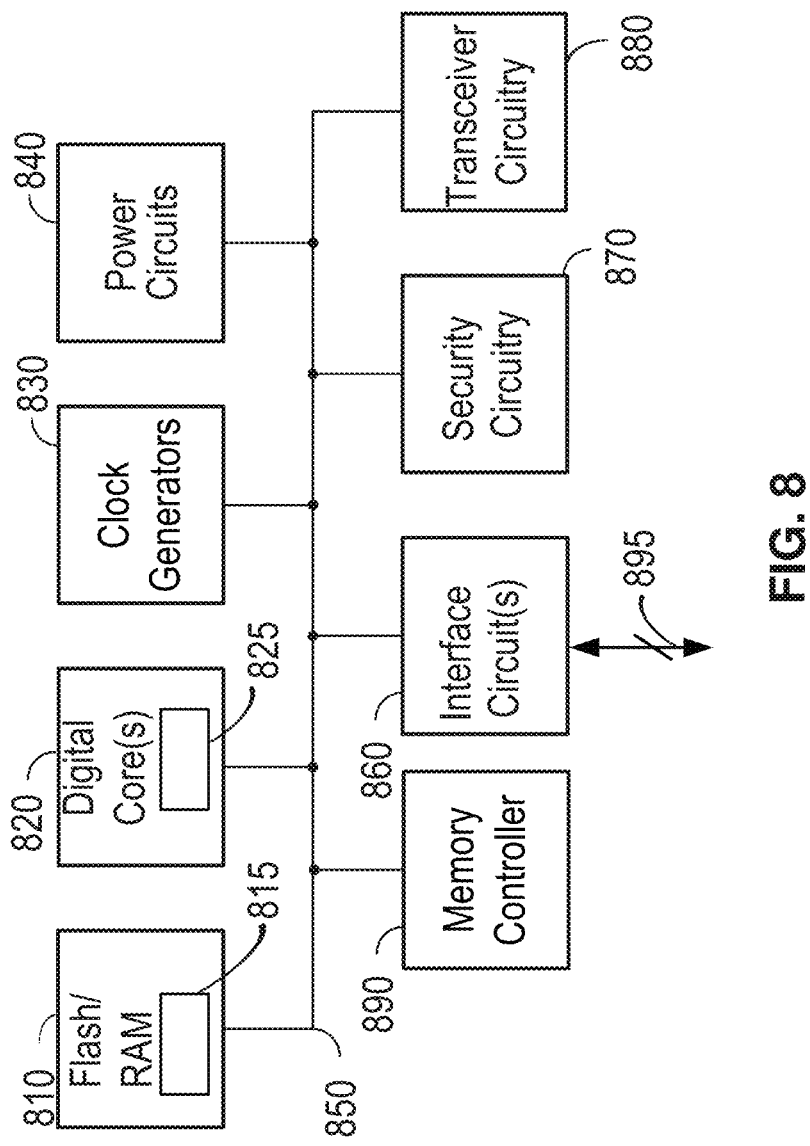
FIG. 8 is a block diagram of a representative integrated circuit in accordance with an embodiment.

Embodiments can be implemented in a variety of wireless device use cases. Referring now to FIG. 8, shown is a block diagram of a representative integrated circuit 800 that includes transceiver circuitry, as described herein. In the embodiment shown in FIG. 8, integrated circuit 800 may be, e.g., a multi-mode wireless transceiver that may operate according to one or more wireless protocols (e.g., Wi-Fi and Bluetooth, among others) or other device that can be used in a variety of use cases. In one or more embodiments, the circuitry of integrated circuit 800 shown in FIG. 8 may be implemented on a single semiconductor die or implemented on separate dies for wireless communication.

Integrated circuit 800 may be incorporated into any type of device that seeks to estimate distances using the HADM techniques described herein. In the embodiment shown, integrated circuit 800 includes a memory system 810 which in an embodiment may include volatile storage, such as RAM and non-volatile memory such as a flash memory. The flash memory is a non-transitory storage medium that can store instructions and data, including instructions 815 that can be used to perform correlation sequence puncturing as described herein. As further shown integrated circuit 800 also may include a memory controller 890.

Memory system 810 couples via a bus 850 to one or more digital cores 820, which may include one or more cores and/or microcontrollers that act as processing units of the integrated circuit, and which may include baseband circuitry 825, which may in turn include demodulation and HADM circuitry, to determine distance based on correlations calculated as described herein. The demodulator may receive a correlation sequence and perform puncturing as described herein, before performing a correlation between the potentially punctured correlation sequence and a received sequence, and sending correlation results to the HADM circuit. Depending on implementation, the correlation can be done in the demodulator or in the HADM circuitry. The demodulator may already use the correlation with the sync word to detect a packet and align timing. In such implementations, this correlation can be reused for HADM purposes. Or, a different correlation can be performed in the HADM circuitry (where puncturing would be performed in the HADM circuitry). In turn, digital cores 820 may couple to clock generators 830 which may provide one or more phase locked loops or other clock generator circuitry to generate various clocks for use by circuitry of the IC.

As further illustrated, IC 800 further includes power circuitry 840. Additional circuitry may be present depending on particular implementation to provide various functionality and interaction with external devices. Such circuitry may include interface circuitry 860 which provides a digital communication interface with additional circuitry via a link 895. IC 800 also may include security circuitry 870 to perform wireless security techniques.

In addition, as shown in FIG. 8, transceiver circuitry 880 may be provided to enable transmission and reception of wireless signals, e.g., according to one or more of a local area or wide area wireless communication scheme, such as Zigbee, Bluetooth, IEEE 802.11, IEEE 802.15.4, cellular communication or so forth. Understand while shown with this high level view, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
generating, in a baseband processor of a receiver, a random correlation sequence;
determining a first number of a first type of a predetermined tuple pattern present in the random correlation sequence, and determining a second number of a second type of the predetermined tuple pattern present in the random correlation sequence; and
based at least in part on the first number and the second number, puncturing a bit of the random correlation sequence.

2. The method of claim 1, further comprising puncturing the bit of a selected instance of the first type of the predetermined tuple pattern when the first number exceeds the second number.

3. The method of claim 2, wherein puncturing the bit of the selected instance of the first type of the predetermined tuple pattern comprises puncturing a left most bit of a first instance of the first type of the predetermined tuple pattern within the random correlation sequence.

4. The method of claim 1, further comprising correlating the punctured random correlation sequence with an incoming frequency signal to obtain a correlation result, the incoming frequency signal received from a transmitter in communication with the receiver.

5. The method of claim 4, further comprising determining, based at least in part on the correlation result, a distance between the transmitter and the receiver.

6. The method of claim 5, wherein determining the distance comprises:
calculating a time estimate based at least in part on the correlation result; and
determining the distance using the time estimate.

7. The method of claim 6, further comprising in response to determining that the receiver is within a threshold distance of the transmitter, performing a security operation for at least one of the transmitter and the receiver.

8. The method of claim 1, further comprising not puncturing the bit of the random correlation sequence when the first number equals the second number.

9. The method of claim 1, further comprising, based at least in part on the first number and the second number, puncturing a plurality of bits of the random correlation sequence.

10. An apparatus comprising:
a radio frequency (RF) transceiver to transmit and receive RF signals; and
a baseband processor coupled to the RF transceiver, wherein the baseband processor comprises:
a puncturer to receive a random bit sequence and, based at least in part on a first count of a first predetermined tuple pattern present in the random bit sequence and a second count of a second predetermined tuple pattern present in the random bit sequence, puncture a bit of the random bit sequence;

a correlator coupled to the puncturer, the correlator to correlate a received sequence with the punctured random bit sequence to obtain a correlation result; and a circuit coupled to the correlator, the circuit to determine a distance between the apparatus and a second device based at least in part on the correlation result.

11. The apparatus of claim 10, wherein the puncturer is to analyze the random bit sequence to determine the first count of the first predetermined tuple pattern and the second count of the second predetermined tuple pattern.

12. The apparatus of claim 10, wherein the circuit comprises a calculator to calculate a time estimate based at least in part on the correlation result.

13. The apparatus of claim 10, wherein the puncturer is to puncture a bit of a selected instance of the first predetermined tuple pattern when the first count exceeds the second count.

14. The apparatus of claim 13, wherein the puncturer is to puncture the bit of the selected instance of the first predetermined tuple pattern comprising a left most bit of a first instance of the first predetermined tuple pattern within the random bit sequence.

15. The apparatus of claim 10, wherein when the second count exceeds the first count, the puncturer is to puncture a bit of a selected instance of the second predetermined tuple pattern comprising a right most bit of a last instance of the second predetermined tuple pattern within the random bit sequence.

16. The apparatus of claim 10, wherein the apparatus comprises a vehicle computing system of a vehicle, and in response to a determination that the second device comprising a key fob is within a threshold distance of the vehicle computing system, is to cause the vehicle to be unlocked.

17. At least one non-transitory storage medium comprising instructions that when executed by at least one processor of a receiver cause the at least one processor to perform a method comprising:

generating a random correlation sequence;

determining a count of one or more predetermined tuple patterns present in the random correlation sequence; and based at least in part on the count of the one or more predetermined tuple patterns, puncturing at least a portion of an instance of at least one of the one or more predetermined tuple patterns present in the random correlation sequence.

18. The at least one non-transitory storage medium of claim 17, wherein determining the count of the one or more predetermined tuple patterns comprises:

determining a first number of a first type of a first predetermined tuple pattern present in the random correlation sequence; and determining a second number of a second type of the first predetermined tuple pattern present in the random correlation sequence.

19. The at least one non-transitory storage medium of claim 18, wherein the method further comprises:

puncturing a bit of a selected instance of the first type of predetermined tuple pattern when the first number exceeds the second number; and puncturing a bit of a selected instance of the second type of predetermined tuple pattern when the second number exceeds the first number.

20. The at least one non-transitory storage medium of claim 17, wherein the method further comprises:

correlating the punctured random correlation sequence with an incoming frequency signal to obtain a correlation result, the incoming frequency signal received from a transmitter in communication with the receiver;

calculating a time estimate based at least in part on the correlation result; and determining a distance using the time estimate.

* * * * *